(12) United States Patent
Lee

(10) Patent No.: US 6,941,820 B2
(45) Date of Patent: Sep. 13, 2005

(54) CUFF TYPE CLAMPING FORCE SENSOR

(76) Inventor: Tony Lee, 6F, No. 5, Lane 83, Kwang Fu Road, Sec. 1, San Chung City, Taipei Hsien (TW)

( * ) Notice: Subject to any disclaimer, the term of this patent is extended or adjusted under 35 U.S.C. 154(b) by 30 days.

(21) Appl. No.: 10/732,410

(22) Filed: Dec. 11, 2003

(65) Prior Publication Data

US 2005/0126302 A1 Jun. 16, 2005

(51) Int. Cl.$^7$ .............................................. G01N 3/02
(52) U.S. Cl. ...................................................... 73/860
(58) Field of Search .......................... 73/856, 818, 819, 73/831, 833, 860

(56) References Cited

U.S. PATENT DOCUMENTS

| | | | | |
|---|---|---|---|---|
| 3,661,409 A | * | 5/1972 | Brown et al. .................. 285/82 |
| 3,765,185 A | * | 10/1973 | Peck et al. ................ 405/168.1 |
| 4,090,405 A | * | 5/1978 | McKee ..................... 73/152.61 |
| 4,441,504 A | * | 4/1984 | Peterson et al. ............. 600/499 |
| 5,181,426 A | * | 1/1993 | Kovalsky ................ 73/862.541 |
| 5,452,662 A | * | 9/1995 | Switzeny ..................... 104/206 |

* cited by examiner

*Primary Examiner*—Max Noori
(74) *Attorney, Agent, or Firm*—Rosenberg, Klein & Lee

(57) ABSTRACT

A cuff type clamping force sensor is mounted around a surface of a load-bearing round column of a forming machine, so as to measure any stretch, tension, and surface stress of the load-bearing round column. The clamping force sensor mainly includes a cuff-type locating seat, at least one cushion pad, and at least one strain meter. The strain meter includes a sensing element, two signal lines of which are vertically inserted through the cushion pad and the locating seat to connect with an amplifier base board fitted in the locating seat to form contacts. The internally provided amplifier base board allows reduction of the space for a working site, simplifies the procedures for setting the amplifier, gives the clamping force sensor an increased mobility, and enables amplifying and sending of a signal from the strain meter without distortion.

2 Claims, 10 Drawing Sheets

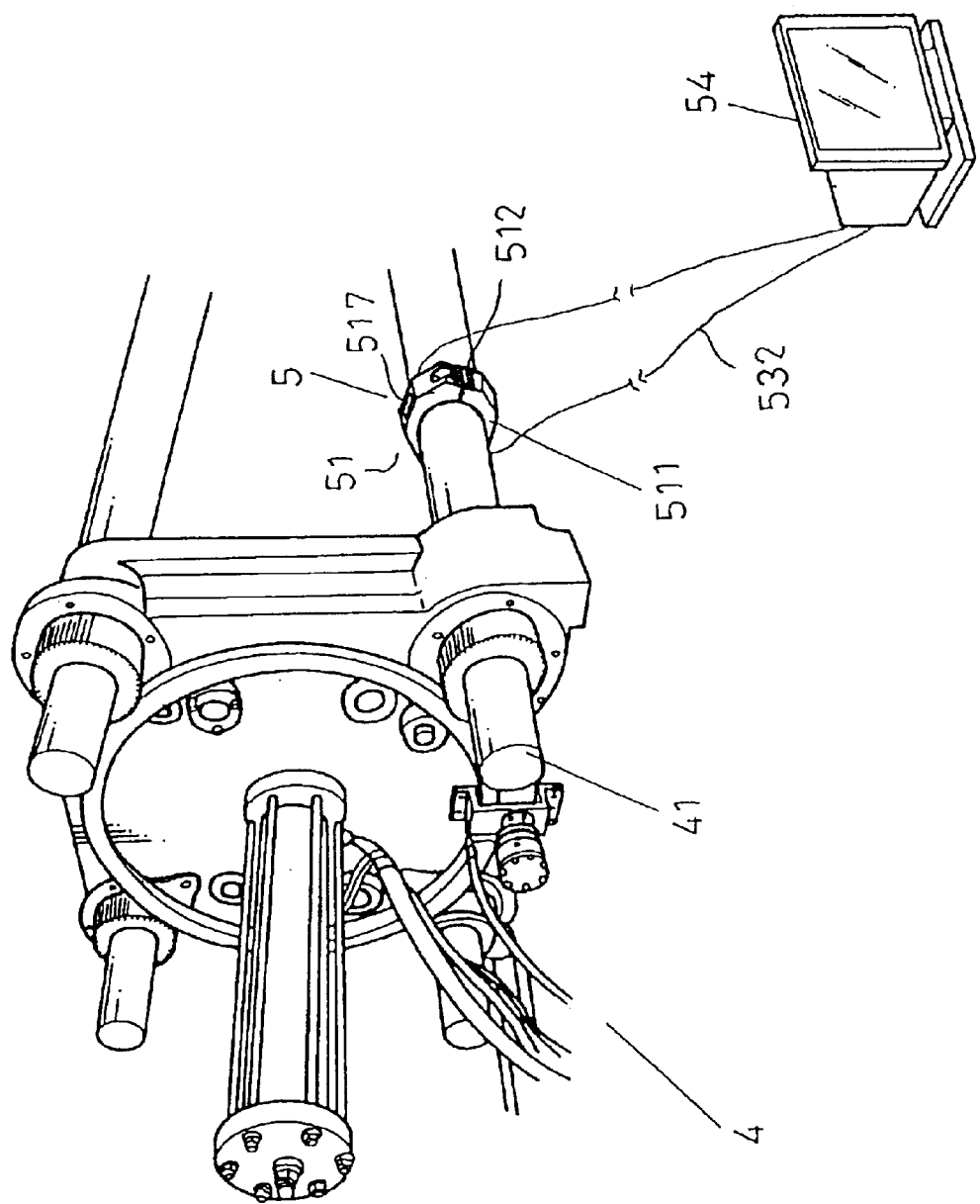
F I G. 3

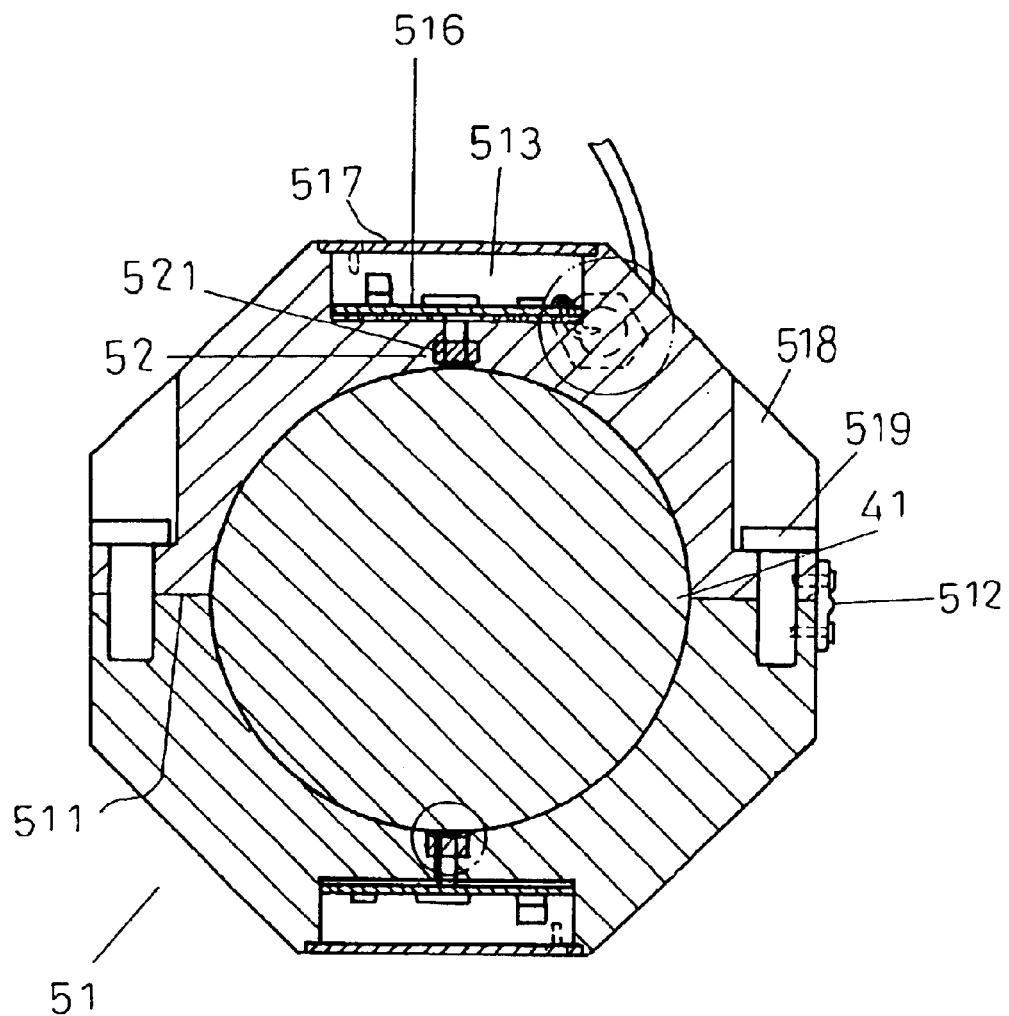
F I G. 5

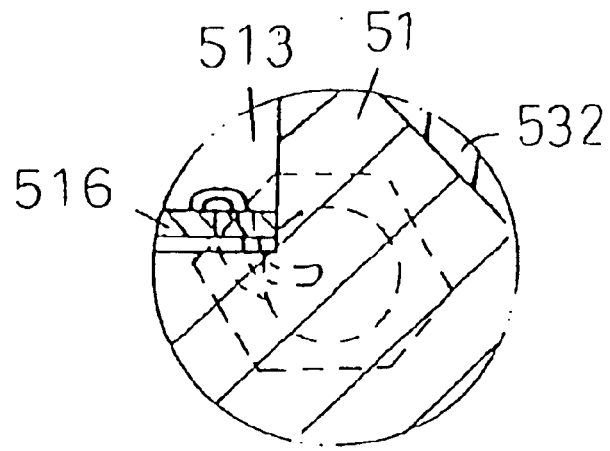
F I G. 5 A
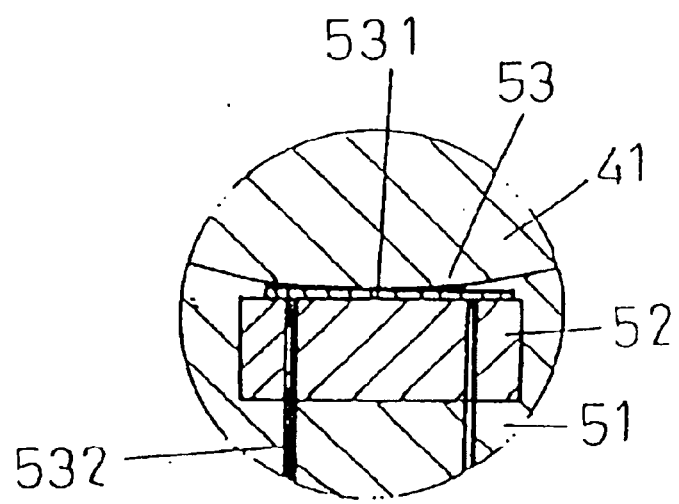
F I G. 5 B

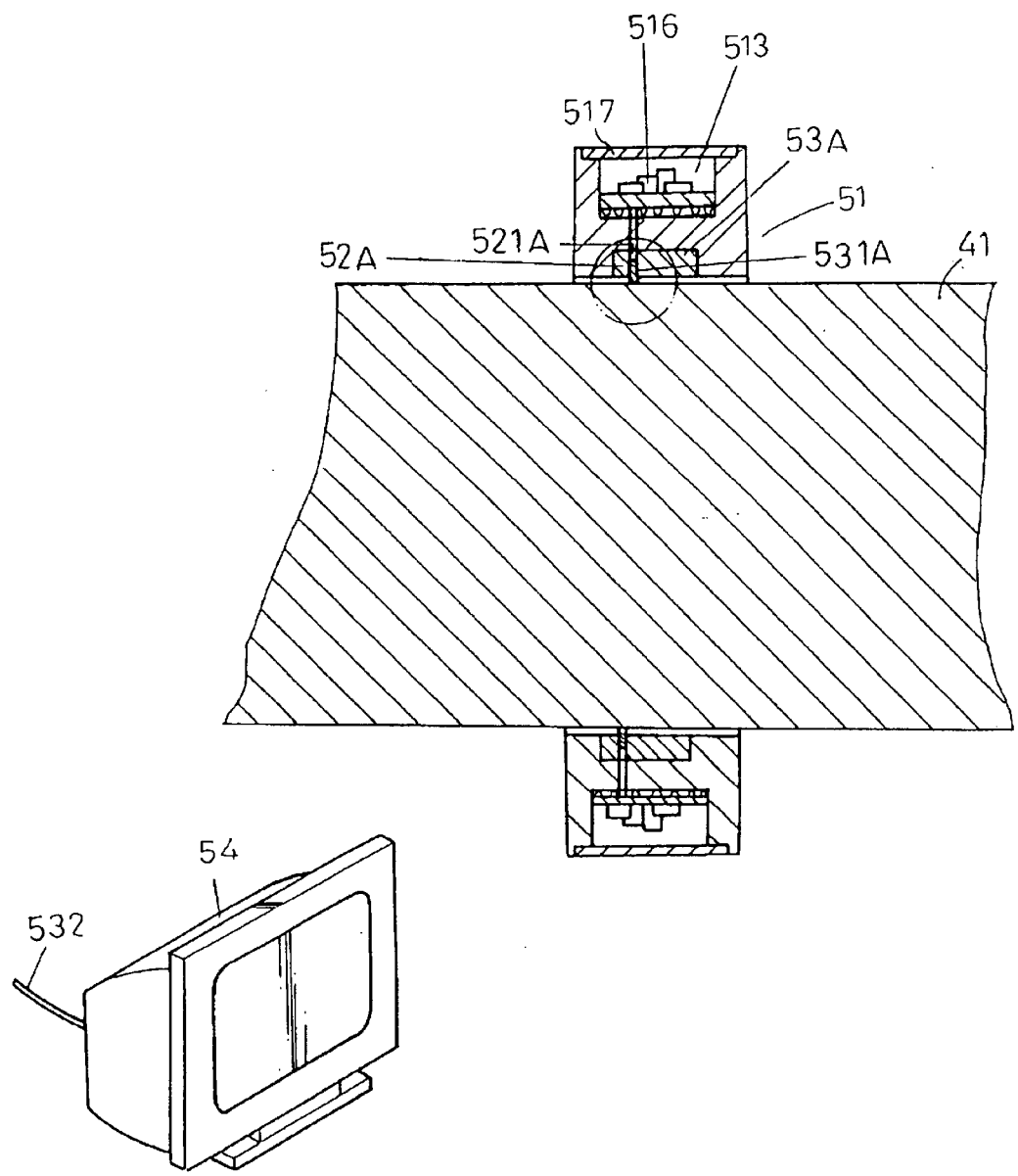
F I G. 6

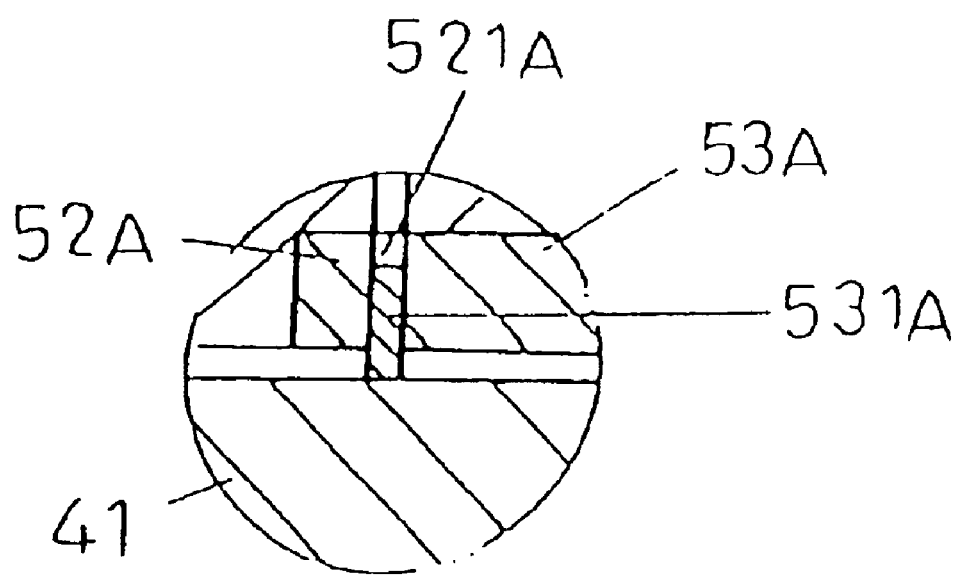
F I G. 6 A

CUFF TYPE CLAMPING FORCE SENSOR

FIELD OF THE INVENTION

The present invention relates to a cuff type clamping force sensor, and more particularly to a clamping force sensor associated with a cuff-type locating seat.

BACKGROUND OF THE INVENTION

Plastics are low weight and relatively tough materials suitable for making various kinds of products for use in our daily life, and plastic-related craft and plastic industry are always important to the modern society. A general injection-molding machine mainly includes two units, namely, an injection mechanism for injecting thermal plastic material and a forming mechanism for opening and closing a mold. The mold generally includes a fixed part and a movable part. Plastic material fed into a material barrel of the injection mechanism enters into an injection barrel via a valve on the material barrel, and is forced forward by a rotating spiral band. At this point, plastic granules are forced to contact with the wall of a heating barrel and heated, molten, and softened. The plastic material is further forced forward in a spiral lead and injected into a mold cavity of a closing mold. A movable clamping cap of the mold is then moved to open or close the mold.

The movement of the movable part of the mold to close the mold is also referred to as clamping mold. The pressure or force at clamping the mold has important influence on the precision of the molded plastic material. Moreover, uneven distribution of the force at clamping the mold would result in bias of the molded plastic material. Therefore, it is necessary to measure the force at clamping the mold and use the measured value as a basis to adjust the clamping force.

The plastic injection-molding machine or die-casting machine developed in the early stage, either a vertical type or a horizontal type as illustrated in the accompanying drawings, typically includes four tie bars. The movable clamping cap is slidably mounted on the four tie bars to move relative to a fixed clamping cap (not shown) and thereby opens or closes the mold. In the process of clamping the mold on the forming machine, the movable clamping cap on the four tie bars applies pressure on the fixed part of the mold, and the applied pressure is axially fed back to the tie bars. The total pressure fed back to all the four tie bars is defined as the clamping force. The higher the pressure applied by the movable clamping cap is, the higher the clamping force is, that is, the higher the axial force fed back to the tie bars is. In other words, on the basis of the same molding material, the higher the pressure applied by the movable clamping cap is, the larger the axial stretch of the tie bars is.

Please refer to FIG. 1 and FIG. 1A that is an enlarged view of the circled area of FIG. 1. A conventional way to measure the clamping force is to provide a conventional meter 1 near a rear end of each tie bar 41 of a forming machine 4. When the tie bar 41 has any minor change in its overall length, that is, has any axial stretch, during the process of clamping the mold to touch a probe 11 of the meter 1, the probe 11 would contact with and press against a spring inside the meter 1, so that the amount of axial stretch of the tie bar 41 may be read from a pointer 12 of the meter 1. The force axially applied to the tie bar 41, that is, the clamping force, may then be calculated from a specific formula using the reading of the meter 1. This way of measuring the clamping force has the following disadvantages:

1. The conventional meter has low accuracy, and the spring inside the meter is subject to elastic fatigue after being used over a long time.
2. An operator has to visually observe the reading of axial stretch amount of the tie bar on the conventional meter. Errors might be caused due to different observation angle and personal subjective judgment or negligence to result in inaccurate data.

FIG. 2 shows another conventional strain meter 2 developed for measuring the clamping force, and FIG. 2A is an enlarged view of the circled area of FIG. 2. Please refer to FIGS. 2 and 2A at the same time. The strain meter 2 mainly includes a sensing element 21 having two signal lines 22 extended therefrom. The two signal lines 22 are electrically connected to a monitor 23, so that a signal from the sensing element 21 may be processed by an operation unit and amplified by an amplifier unit, and finally displayed on the monitor 23. This type of strain meter 2 is flatly adhered to an outer surface of the tie bar 41 of the forming machine 4. When the movable clamping cap is slid on the tie bars 41 relative to the fixed clamping cap to open or close the mold, the sensing element 21 is able to detect a change in the electric resistance of the tie bars 41 due to the axial stretch thereof, and thereby measures the clamping force at the time the mold is closed. However, this type of strain meter 2 has the following disadvantages:

1. The sensing element is removably adhered to the outer surface of the tie bar. When the sensing element is released from the tie bar after use, it is damaged and the strain meter must be discarded. It is apparently not economical to discard the high precision and costly strain meter when the same has been used for only one time.
2. The sensing elements are not easily adhered to the tie bars at uniform angle and tightness, and would therefore have adverse influence on the measurements.
3. It is troublesome and time-consuming to accurately adhere the sensing elements to the tie bars at uniform angle and tightness.
4. The signal from the strain meter must be amplified with the amplifier, and the amplifier must be separately provided to inevitably interfere with the layout of the working site. Moreover, complicate procedures are involved in wiring the amplifier and related parts, and the amplifier could not be conveniently moved once it is fixed to a certain position.

SUMMARY OF THE INVENTION

A primary object of the present invention is to provide a clamping force sensor having a sensing element that could be used in an economical manner.

Another object of the present invention is to provide a clamping force sensor to substitute for the conventional adhesive type strain meter.

A further object of the present invention is to provide a clamping force sensor that does not need an external amplifier to amplify the signal from the sensor.

To achieve the above and other objects, the clamping force sensor of the present invention mainly includes a cuff-type locating seat, at least one cushion pad, and at least one strain meter. The strain meter includes a sensing element, two signal lines of which are vertically inserted through the cushion pad and the locating seat to connect with an amplifier base board fitted in the locating seat to form contacts. The internally provided amplifier base board allows reduction of the space for a working site, simplifies the procedures for setting the amplifier, gives the clamping force sensor an increased mobility, and enables amplifying and sending of a signal from the strain meter without distortion.

More specifically, the following advantages may be achieved with the present invention:

1. The sensing element is detachably associated with the locating seat and can therefore be repeatedly used many times after each measurement. The high precision and costly strain meter can therefore be used in a much more economical manner.
2. The sensing element is associated with the locating seat to enable uniform and accurate mounting angle on the forming machine and ensure accurate and stable measurements.
3. With the present invention, it is possible to quickly and accurately know the force applied to each tie bar.
4. The amplifier base board is directly provided in the locating seat to reduce the space that is otherwise occupied by a separate amplifier in the working site. The initially complicate procedures for setting the amplifier are simplified to enable an increased mobility of the present invention. That is, the amplifier base board may be installed at any place along with the strain meter and the locating seat. Moreover, the signal from the strain meter may be amplified in real time and sent to the operation unit without distortion.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein

FIG. 1A is an enlarged view of the circled area of FIG. 1;

FIG. 3 is a perspective view showing the use of a clamping force sensor of the present invention to detect the clamping force;

FIG. 5 is a sectional view showing the use of the present invention;

FIGS. 5A and 5B are enlarged views of the circled areas of FIG. 5;

FIG. 6 is a fragmentary sectional view showing the use of a clamping force sensor according to another embodiment of the present invention; and FIG. 6A is an enlarged view of the circled area of FIG. 6.

DETAILED DESCRIPTION OF THE PREFERRED EMBODIMENTS

Figure 1:
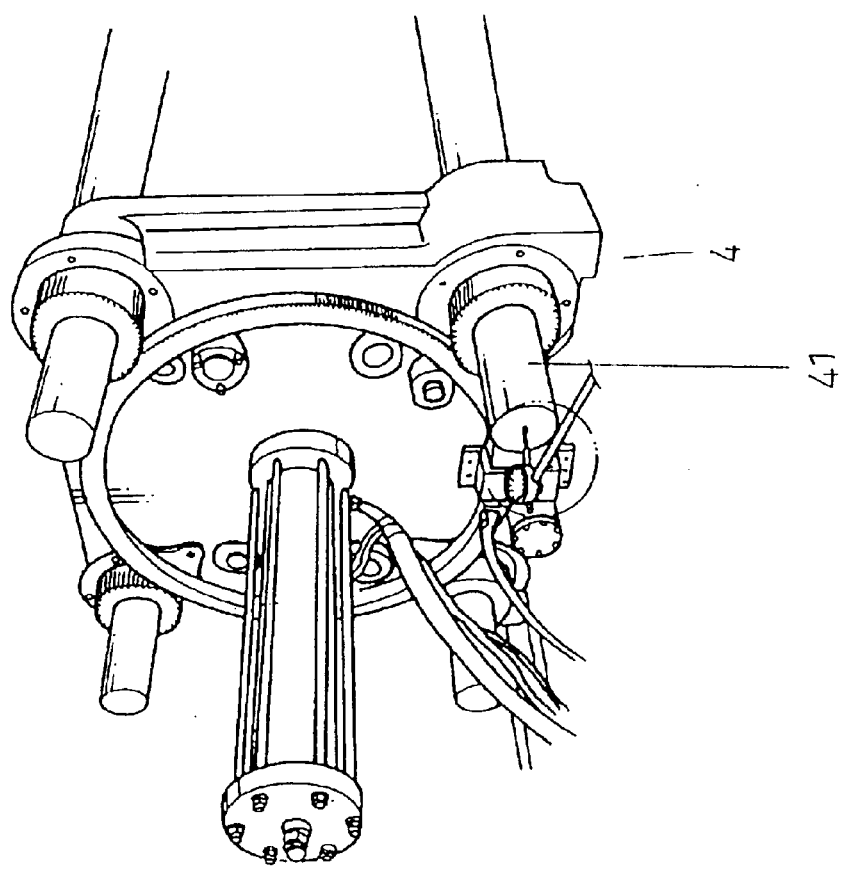
FIG. 1 is a perspective view showing the use of a conventional meter to measure the clamping force.
Figure 1:
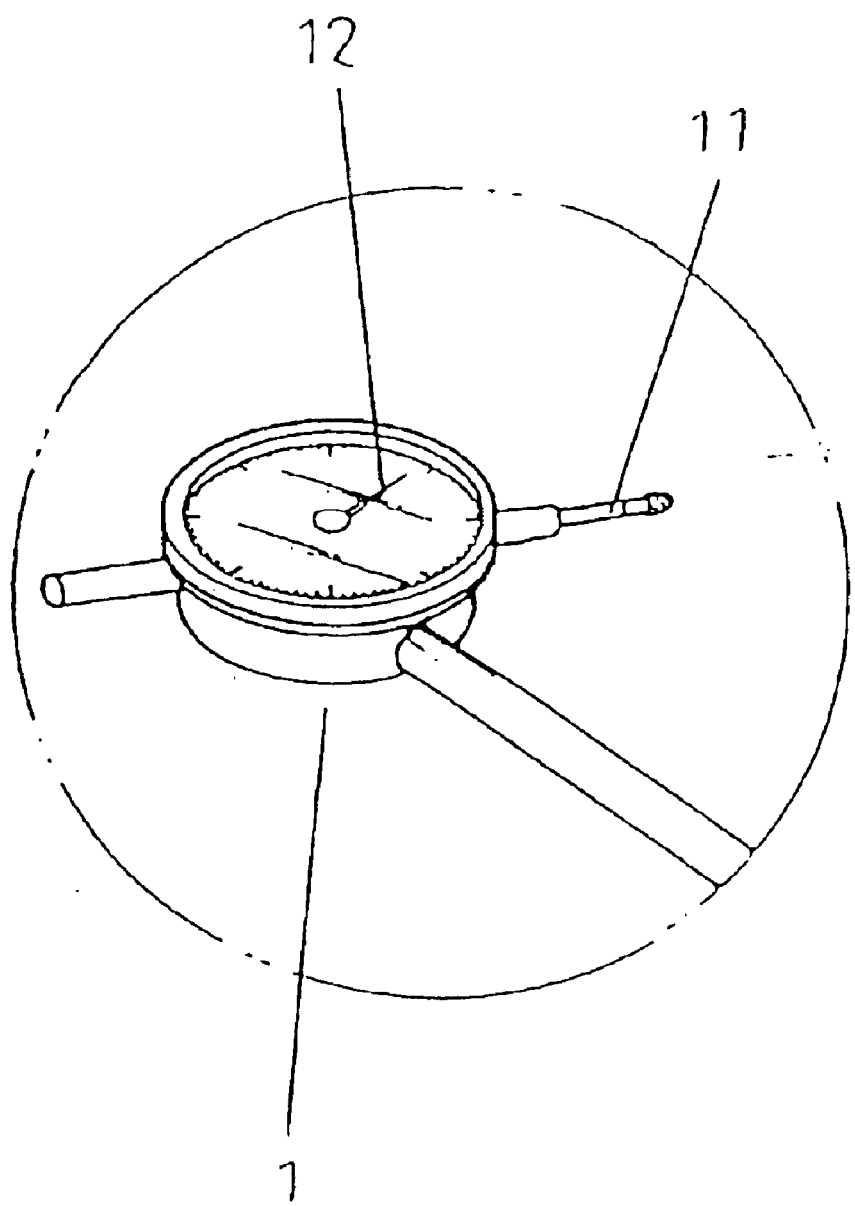
Figure 2:
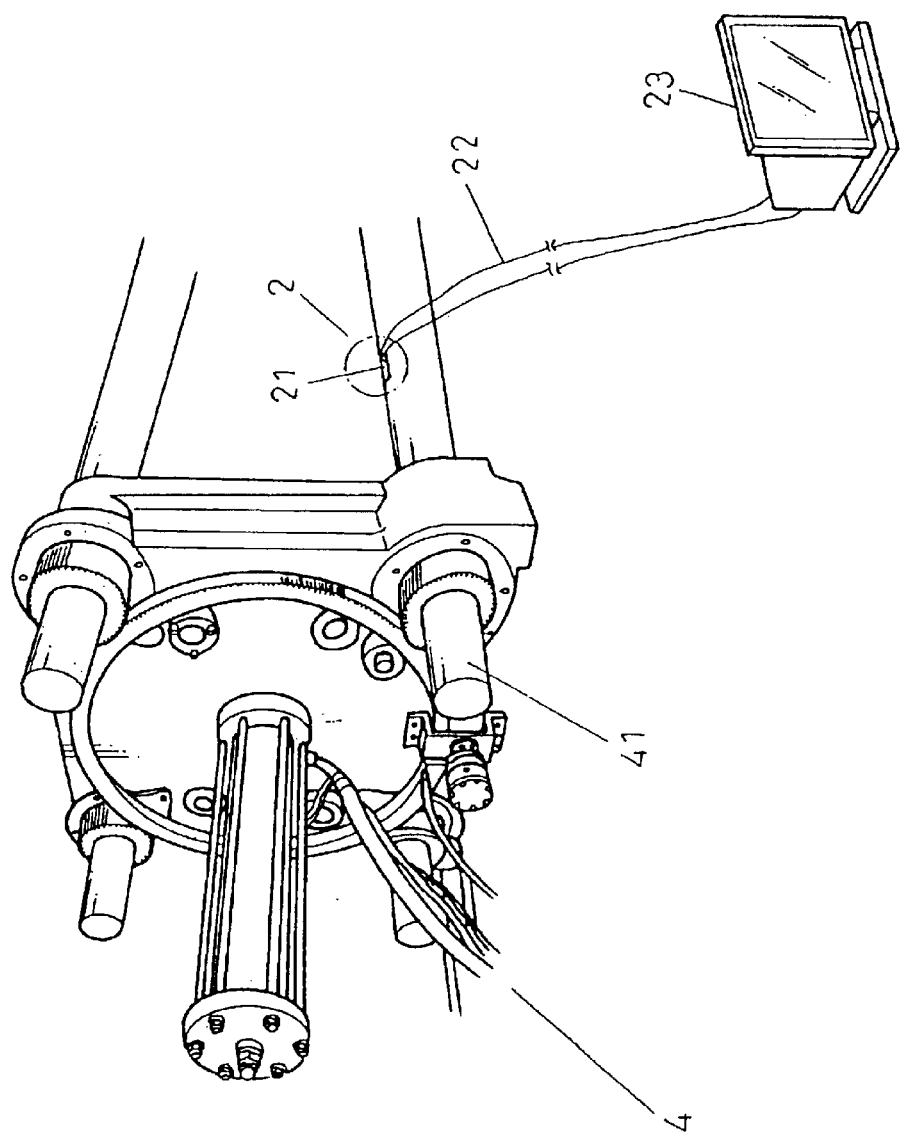
FIG. 2 is a perspective view showing the use of a conventional strain meter to detect the clamping force.
Figure 2A:
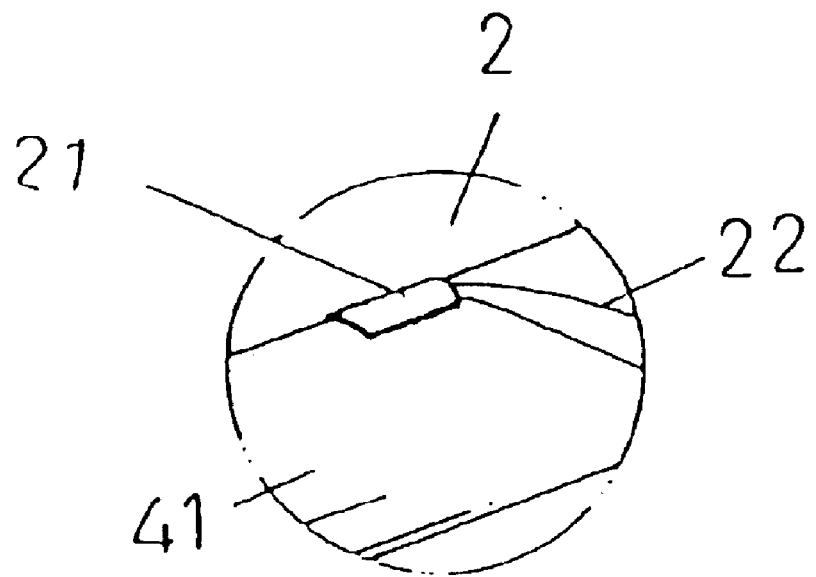
FIG. 2A is an enlarged view of the circled area of FIG. 2.
Figure 4:
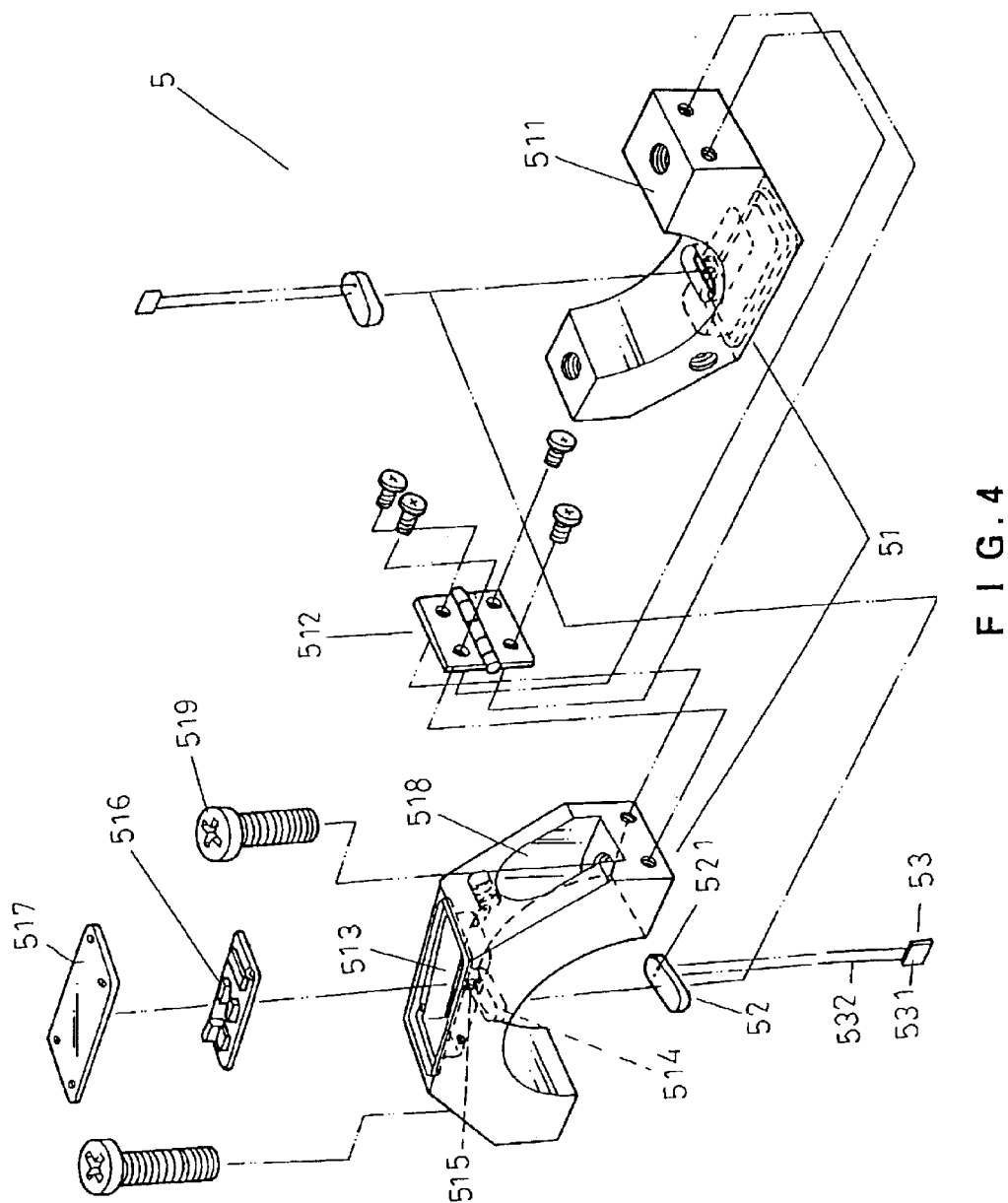
FIG. 4 is an exploded perspective view of the present invention.

Please refer to FIG. 3. The present invention relates to a cuff type clamping force sensor 5 for widely using on a surface of a load-bearing round column of a forming machine, including injection-molding machine and die casting machine, a punching machine, a press, or other machinery, so as to measure any stretch, tension, and surface stress of the load-bearing round column. A forming machine 4 will now be used as an example to describe the present invention. The forming machine 4 includes a movable clamping cap slidably guided by four symmetrically arranged tie bars 41, so that the movable clamping cap is moved relative to a back plate of a mold to thereby close or open the mold. The clamping force sensor 5 of the present invention is mounted around an outer surface of one tie bar 41 near a rear end thereof. Please refer to FIG. 4. The clamping force sensor 5 mainly includes a locating seat 51, at least one cushion pad 52, and at least one strain meter 53.

The locating seat 51 includes two mating halves 511 that are pivotally connected at one of two lateral ends via a hinge 512 so as to close or open relative to each other and removably mount on the tie bar 41. The mating halves 511 are provided at the two lateral ends with two corresponding locking sections 518, through which screws 519 are threaded to lock the two mating halves 511 into one body. Each of the two mating halves 511 is provided at a top with a first recess 513, and at a bottom with a second recess 514. A plurality of line passages 515 are provided on each mating half 511 to extend through the first and the second recess 513, 514. An amplifier base board 516 is fitted in the first recess 513, and a cover 517 is closed to the first recess 513 to enclose the amplifier base board 516 in the first recess 513, giving the top of the mating half 511 a flat and beautiful appearance.

The cushion pad 52 is made of a soft material for fitting in the second recess 514 of each mating half 511. Pad passages 521 are provided to extend through the cushion pad 52 and communicate with the line passages 515.

The strain meter 53 mainly includes a sensing element 531 having two signal lines 532 extended therefrom. The signal lines 532 of the strain meter 53 are vertically inserted into the pad passages 521 of the cushion pad 52 and extended through the line passages 515 on the mating half 511 to connect with the amplifier base board 516 in the first recess 513 and form contacts.

As can be seen from FIGS. 5, 5A, and 5B, the sensing element 531 is partially exposed from a lower side of the cushion pad 52 in the second recess 514 to contact with a predetermined outer surface of the tie bar 41.

As it is illustrated in FIGS. 6 and 6A, in another embodiment of the clamping force sensor 5, there may be otherwise provided with a cushion pad 52A having a flat-profiled pad passage 521A, so that a sensing element 531A of a strain meter 53A of the second embodiment may be correspondingly inserted into the flat-profiled pad passage 521A. In this case, an end surface of the sensing element 531A is exposed from the cushion pad 52A to contact with the outer surface of the tie bar 41.

Please refer to FIGS. 5, 5A, and 5B. The locating seat 51 of the present invention is mounted around the outer surface of the tie bar 41 to detect and measure the clamping force. The signal lines 532 of the strain meter 53 are vertically inserted into the pad passages 521 of the cushion pad 52 and extended through the line passages 515 on the mating half 511 to connect with the amplifier base board 516 in the first recess 513 and form contacts. The sensing element 531 is partially exposed from the cushion pad 52 to provide a proper surface contact with the outer surface of the tie bar 41. In FIGS. 5 and 5B, the exposed portion of the sensing element 531 has a relatively large area and may therefore be flexibly bent to enable a flat surface contact with the outer surface of the forming machine 4.

Please refer to FIGS. 6 and 6A. The sensing element 531A of the strain meter 53A is vertically inserted into the flat-profiled pad passage 521A of the cushion pad 52A and extended through the line passages 515 on the mating half 511 to connect with the amplifier base board 516 in the first recess 513 and form contacts. The sensing element 531A is partially exposed from the cushion pad 52A to contact with the outer surface of the tie bar 41. In FIGS. 6 and 6A, only the end surface of the sensing element 531A is in contact with the outer surface of tie bar 41.

When a force is applied in the process of closing the mold, a feedback force of the applied force would cause the back plate of the forming machine to produce a minor axial stretch. Such axial stretch of the back plate produces change in the electric resistance of the back plate, which may be detected by the sensing element 531 of the strain meter 53 in contact with the back plate, and a signal is sent from the strain meter 53 via the signal lines 532 to the amplifier base board 516 fitted in the mating half 511 of the locating seat 51. An operation unit conducts an operation on the signal to calculate a variation of the axial stretch of the back plate. The calculated variation is then displayed on a monitor 54, which is electrically connected to the clamping force sensor 5 via the signal lines 532, to indicate the value of strain of the back plate.

The clamping force sensor of the present invention has the following advantages:

1. The sensing element is detachably associated with the locating seat and can therefore be repeatedly used many times after each measurement. The high precision and costly strain meter can therefore be used in a much more economical manner.
2. The sensing element is associated with the locating seat to enable uniform and accurate mounting angle on the forming machine and ensure accurate and stable measurements.
3. With the present invention, it is possible to quickly and accurately know the force applied to each tie bar.
4. The amplifier base board is directly provided in the locating seat to reduce the space that is otherwise occupied by a separate amplifier in the working site. The initially complicate procedures for setting the amplifier are simplified to enable an increased mobility of the present invention. That is, the amplifier base board may be installed at any place along with the strain meter and the locating seat. Moreover, the signal from the strain meter may be amplified in real time and sent to the operation unit without distortion.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A cuff type clamping force sensor for mounting on a surface of a load-bearing round column of a forming machine, including injection-molding machine and die casting machine, a punching machine, a press, or other machinery, so as to measure any stretch, tension, and surface stress of said load-bearing round column; said clamping force sensor comprising a locating seat, at least one cushion pad, and at least one strain meter;

said locating seat being mounted around an outer surface of said load-bearing round column of said forming machine near a rear end thereof, and including two mating halves that are pivotally connected at one of two lateral ends via a hinge so as to close or open relative to each other; said mating halves being provided at said two lateral ends with two corresponding locking sections, through which screws are threaded to lock said two mating halves into one body; each of said two mating halves being provided at a top with a first recess, and at a bottom with a second recess; a plurality of line passages being provided on each said mating half to extend through said first and said second recess; an amplifier base board being fitted in said first recess, and a cover being closed to said first recess to enclose said amplifier base board in said first recess, giving the top of said mating half a flat and beautiful appearance;

said cushion pad being made of a soft material for fitting in said second recess of each said mating half; pad passages being provided to extend through said cushion pad and communicate with said line passages; and said strain meter mainly including a sensing element having two signal lines extended therefrom; said signal lines being vertically inserted into said pad passages of said cushion pad and extended through said line passages on said mating half to connect with said amplifier base board in said first recess and form contacts, so that said sensing element is partially exposed from a bottom of said cushion pad to contact with the outer surface of said forming machine at a predetermined position.

2. The cuff type clamping force sensor as claimed in claim 1, wherein said pad passage provided on said cushion pad is flat-profiled, and wherein said sensing element of said strain meter is directly inserted into said flat-profiled pad passage to expose an end surface from said cushion pad to contact with the outer surface of said forming machine at said predetermined position.

* * * * *